US 7,725,346 B2

(12) United States Patent
Gruhl et al.

(10) Patent No.: US 7,725,346 B2
(45) Date of Patent: May 25, 2010

(54) METHOD AND COMPUTER PROGRAM PRODUCT FOR PREDICTING SALES FROM ONLINE PUBLIC DISCUSSIONS

(75) Inventors: Daniel Frederick Gruhl, San Jose, CA (US); Ramanathan Vaidhyanath Guha, Los Altos, CA (US); Jasmine Novak, Mountain View, CA (US); Shanmugasundaram Ravikumar, San Jose, CA (US); Andrew S. Tomkins, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 981 days.

(21) Appl. No.: 11/191,776

(22) Filed: Jul. 27, 2005

(65) Prior Publication Data

US 2007/0027741 A1    Feb. 1, 2007

(51) Int. Cl.
    *G06F 17/18* (2006.01)
(52) U.S. Cl. .............................. 705/10; 705/7; 709/229
(58) Field of Classification Search .................. 705/10
    See application file for complete search history.

(56) References Cited

U.S. PATENT DOCUMENTS

| 4,531,188 | A  | * | 7/1985  | Poupon et al. ............... 702/7 |
| 6,202,063 | B1 | * | 3/2001  | Benedikt et al. .............. 707/3 |
| 6,272,472 | B1 | * | 8/2001  | Danneels et al. ............. 705/27 |
| 6,801,945 | B2 | * | 10/2004 | Lin et al. .................... 709/229 |
| 7,251,589 | B1 | * | 7/2007  | Crowe et al. ................ 702/189 |
| 7,421,155 | B2 | * | 9/2008  | King et al. .................. 382/312 |
| 2001/0011235 | A1 |  | 8/2001  | Kim et al. |
| 2001/0034686 | A1 |  | 10/2001 | Eder |
| 2002/0174087 | A1 |  | 11/2002 | Hao et al. |
| 2003/0187719 | A1 |  | 10/2003 | Brocklebank |
| 2004/0010435 | A1 |  | 1/2004  | Stewart et al. |
| 2004/0019518 | A1 |  | 1/2004  | Abraham et al. |
| 2005/0038717 | A1 |  | 2/2005  | McQueen, III et al. |
| 2005/0049909 | A1 |  | 3/2005  | Kumar et al. |
| 2006/0010142 | A1 | * | 1/2006  | Kim et al. .................... 707/100 |
| 2006/0078207 | A1 | * | 4/2006  | King et al. ................... 382/229 |
| 2006/0129399 | A1 | * | 6/2006  | Turk et al. .................... 704/256 |

(Continued)

OTHER PUBLICATIONS

Peaks to Prairies P2 Info Center Q3 2003 Filtered WebTrends, http://peakstoprairies.org, Web Log Analysis Quarterly Report Q3 2003, Report Range:Jul. 1, 2003 00:00:00-Sep. 30, 2003 23:59:59, www.netiq.com.*

(Continued)

*Primary Examiner*—Beth V Boswell
*Assistant Examiner*—Justin M Pats
(74) *Attorney, Agent, or Firm*—Samuel A. Kassatly; Shimokaji & Associates, P.C.

(57) ABSTRACT

A sales prediction system predicts sales from online public discussions. The system utilizes manually or automatically formulated predicates to capture subsets of postings in online public discussions. The system predicts spikes in sales rank based on online chatter. The system comprises automated algorithms that predict spikes in sales rank given a time series of counts of online discussions such as blog postings. The system utilizes a stateless model of customer behavior based on a series of states of excitation that are increasingly likely to lead to a purchase decision. The stateless model of customer behavior yields a predictor of sales rank spikes that is significantly more accurate than conventional techniques operating on sales rank data alone.

15 Claims, 4 Drawing Sheets

U.S. PATENT DOCUMENTS

2006/0253790 A1* 11/2006 Ramarajan et al. .......... 715/764

OTHER PUBLICATIONS

Webtrends, http://web.archive.org/web/20031207144742/netiq.com/webtrends/default.asp?origin=ws_Home.* www.archive./web/20010919170000/www.archive.org/.*

Daniel Gruhl, R. Guha, Ravi Kumar, Jasmine Novak, Andrew Tomkins, The Predictive Power of Online Chatter, Proceedings of the eleventh ACM SIGKDD international conference on Knowledge discovery in data mining 2005, Chicago, Illinois, USA Aug. 21-24, 2005.*

Natalie S. Glance, Matthew Hurst, and Takashi Tomokiyo, BlogPulse: Automated Trend Discovery for Weblogs, Transactions of the ACM, May 17-22, 2004; http://www.blogpulse.com/papers/2005/fukuhara.pdf.*

Tomohiro Fukuhara, Toshihiro Murayama, Toyoaki Nishida, Analyzing Concerns of People using Weblog Articles and Real World Temporal Data, May 10-14, 2005; http://www.blogpulse.com/papers/2005/fukuhara.pdf.*

Chris Chatfield, Time-Series Forecasting, Chapman & Hall/CRC, 2002.*

* cited by examiner

METHOD AND COMPUTER PROGRAM PRODUCT FOR PREDICTING SALES FROM ONLINE PUBLIC DISCUSSIONS

FIELD OF THE INVENTION

The present invention generally relates to text analytics and in particular relates to prediction of sales as a result of information obtained through analysis of information accessible in online discussions.

BACKGROUND OF THE INVENTION

The World Wide Web represents a global, timely, and largely unregulated touchstone of popular opinion, which many believe may be exploited for early insights into new trends and opinions. Areas proposed for such analysis comprise the outcome of political elections, the emergence of the next big musical group/toy/consumer electronic device, and the pulse of the global economy. Yet, despite widely touted opinions that marketing will soon be a small branch of machine learning, there has been little work formally demonstrating connections between online content and customer behavior such as purchase decisions.

Predicting sales from indicators is an important problem in marketing and business. The very concept of creating a new product is predicated on the assumption (or rather, prediction) that someone will eventually purchase it. The same can be said for pricing, inventory planning, production capacity planning, store placement and layout, etc.

One conventional technology for predicting sales from indicators analyzes the nature of sales spikes in amazon.com sales rank data. This approach shows that two distinct types of peaks may be identified by their growth and relaxation patterns, and this approach ties these two spike types to endogenous and exogenous events. However, this approach only addresses sales rank data to determine spikes in sales.

Another conventional approach to predicting sales from online postings predicts box office proceeds of movies from opinions posted to net news. This approach utilizes the power of Internet discussion in understanding customer views of a product or brand. Yet another conventional approach examines community-created metadata on music artists, using "buzz" or discussion on blogs to predict record sales.

Although these technologies have proven to be useful, it would be desirable to present additional improvements. Conventional approaches have not addressed the use of online public discussion to predict sales of products. An increasing fraction of the global discourse is migrating online in the form of weblogs, bulletin boards, web pages, wikis, editorials, in addition to new collaborative technologies. This migration has now proceeded to the point that topics reflecting certain individual products are sufficiently popular to allow targeted online tracking of the ebb and flow of "chatter" or postings in online discussions around these topics.

What is therefore needed is a system, a service, a computer program product, and an associated method for predicting sales from online public discussions. The need for such a solution has heretofore remained unsatisfied.

SUMMARY OF THE INVENTION

The present invention satisfies this need, and presents a system, a service, a computer program product, and an associated method (collectively referred to herein as "the system" or "the present system") for predicting sales from online public discussions. The present system utilizes manually or automatically formulated predicates, restrictions, or queries to capture subsets of postings in online public discussions; these captured subsets of postings are sufficiently well connected to discussions of a particular product to exhibit leading behavior that predicts sales. Online discussions comprise, for example, weblogs, bulletin boards, web pages, wikis, editorials, in addition to new collaborative technologies. Writings posted in the online discussions are referenced as chatter. "Buzz" references chatter focused on a particular item, topic, or set of topics.

The present system predicts spikes in sales rank based on online chatter, where sales rank is sales of a product compared to similar products; i.e., the present system uses online chatter as a leading indicator of sales. The present system comprises automated algorithms that predict spikes in sales rank given a time series of counts of online discussions such as weblog (further referenced herein as blog) postings. The present system utilizes a stateless model of customer behavior based on a series of states of excitation that are increasingly likely to lead to a purchase decision. The stateless model of customer behavior yields a predictor of sales rank spikes that is significantly more accurate than conventional techniques operating on sales rank data alone.

The present system comprises a restriction or query generator that receives input from product information and generates either manually or automatically a restriction or query. A filter uses the generated restriction or query to filter temporally defined input from online discussions. Temporally defined input comprises chatter that comprises a time stamp. The filter generates a signal that quantifies references to a product specified from product information with respect to time. A prediction module detects spikes in the signal of sufficient quality to indicate a pending spike in sales for the specified product and generates a categorized prediction of an impending spike in sales. Analysis of blog mention data up to a point t by the prediction module enables the present system to effectively predict that a future spike in sales ranks is imminent, without recourse to information from the future, and even without recourse to the history of sales ranks. The term imminent represents the concepts encompassed by the terms soon, near term, occurring in the foreseeable future, etc.

The queries or restrictions generate sets of postings that discuss a particular product. Plots of these discussions generated as a signal often display early indications of future spikes in sales rank. Queries or restrictions are manually or automatically constructed. While discussed in terms of sales, the present invention can also be used to predict other events such as, for example, as voting behavior or popular response to corporate and public policy decisions.

The present system comprises a model that explains behavior of spikes in mentions of a product in online discussions and sales rank. In this model, $B_1, \ldots, B_n$ denote the state of bloggers (persons posting to blogs) where higher-numbered states correspond to a populace more involved in discussion of the product. States $S_1, \ldots, S_m$ denote a decision to buy, where $S_i$ means the sales rank spike will occur on m−i days in the future. The output distributions from $B_i$ are determined empirically; higher numbered $B_i$s are both more likely to transition to an $S_j$ state and more likely to transition to a higher $S_j$ state.

The present system may be embodied in a utility program such as a sales prediction utility program. The present system also provides means for the user to identify a product information input to select a product or set of products for which to predict sales. The present system further proves means to specify a temporally defined input from an online discussion. The present system provides means for a user to select a product or set of products from the product information input for prediction of sales and optionally to enter a manual restriction or query. The present system provides means for a user to invoke the sales prediction utility program, producing a categorized sales prediction for an identified product or set of products.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following definitions and explanations provide background information pertaining to the technical field of the present invention, and are intended to facilitate the understanding of the present invention without limiting its scope:

Blogger: A person maintaining or posting to a weblog. Blogger is used in general to reference any person posting any type of message to a public board.

Buzz: Writing focused on a particular item, topic, or set of topics.

Chatter: Background level of discussion posted in the online discussions.

Spike: An exemplary characteristic of the signal that reflects a substantial (i.e., noticeable) change in the importance, or the flow of the topic discussion. A more specific example of the characteristic of the signal includes a ramp having a slope within a predefined range.

Mention: A reference in an online discussion to a product or other event being tracked to predict future sales spikes.

Online Discussion: A written discussion comprising input from several persons; this discussion is posted to weblogs, bulletin boards, web pages, wikis, editorials, in addition to new collaborative technologies.

Public Board: An accessible electronic forum in which a user such as an Internet user can post messages, weblogs, etc., or participate in an online discussion. Public boards comprise public, private, semi-private discussions or discussions generated under a subscription format. Exemplary public boards are weblogs, bulletin boards, web pages, wikis, editorials, in addition to new collaborative technologies.

Product: As used herein, a product is not limited to a physical article, but could include, for example, a service, or any other valuable intellectual or actual property of value;

Weblog (blog): An example of a public board on which online discussion takes place.

Figure 1:
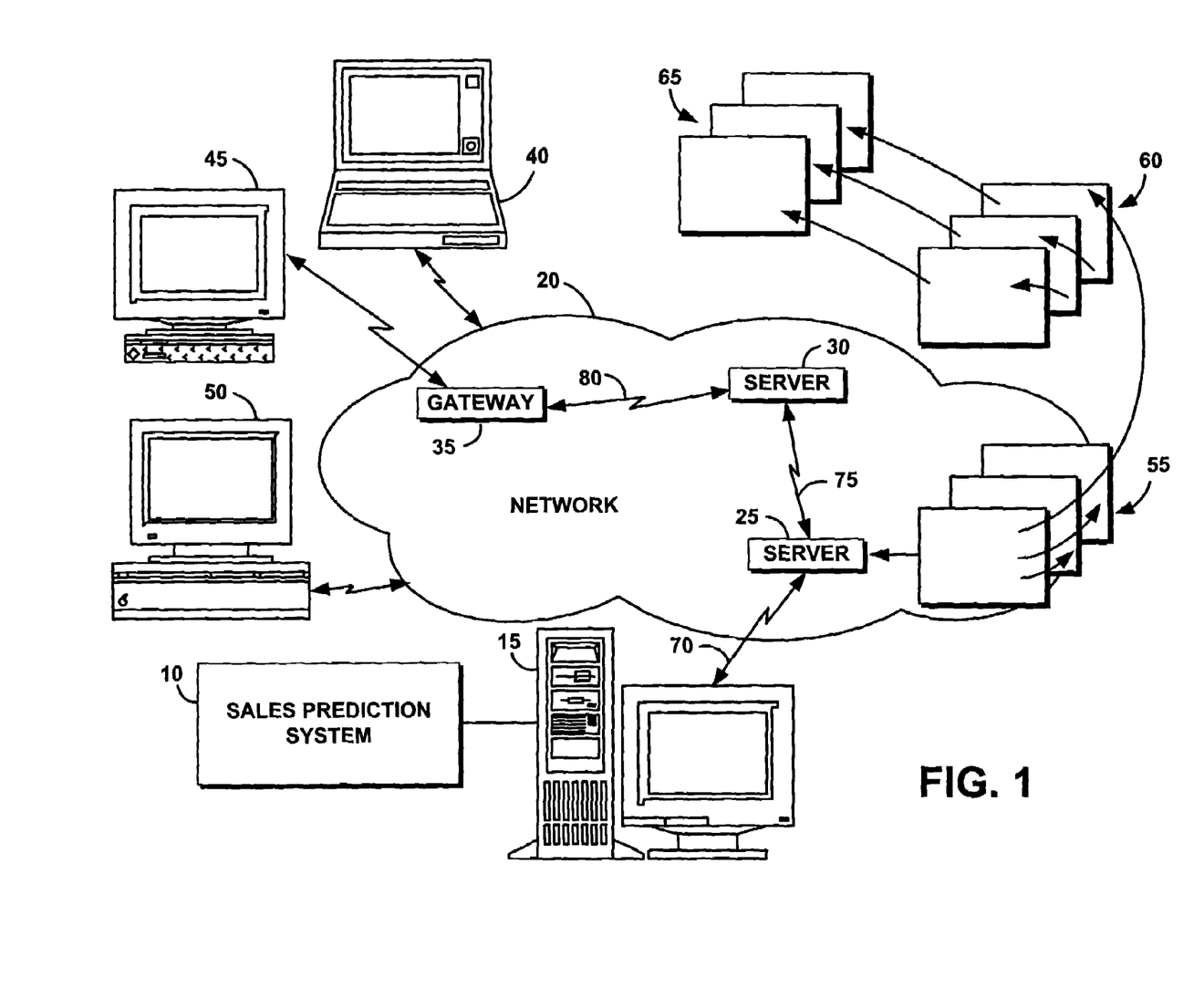
FIG. 1 is a schematic illustration of an exemplary operating environment in which a sales prediction system of the present invention can be used.

FIG. 1 portrays an exemplary overall environment in which a system, a service, a computer program product, and an associated method for predicting sales from online public discussions using derivative equations and factors (the "system 10") according to the present invention may be used. System 10 includes a software or computer program product that is typically embedded within or installed on a host server 15. Alternatively, the system 10 can be saved on a suitable storage medium such as a diskette, a CD, a hard drive, or like devices. While the system 10 will be described in connection with the World Wide Web (WWW), the system 10 may be used with a stand-alone database of documents or other text sources that may have been derived from the WWW or other sources.

The cloud-like communication network 20 is comprised of communication lines and switches connecting servers such as servers 25, 30, to gateways such as gateway 35. The servers 25, 30 and the gateway 35 provide communication access to the Internet. Bloggers, such as remote Internet bloggers, are represented by a variety of computers such as computers 40, 45, 50, and post information such as text to a public board; the text is posted in the form of conversations or discussions indicated generally at 55, 60, 65. As used herein, the term blogger generally represents any person posting to a public discussion online. While the present invention is described for illustration purpose only in relation to online public discussion, it should be clear that the invention is applicable, as well to, for example, discussions conducted online in private or semi-private forums comprising subscription forums, and any other forum accessible by the host server 15.

The host server 15 is connected to the network 20 via a communications link 70 such as a telephone, cable, or satellite link. The servers 25, 30 can be connected via high-speed Internet network lines 75, 80 to other computers and gateways.

Figure 2:
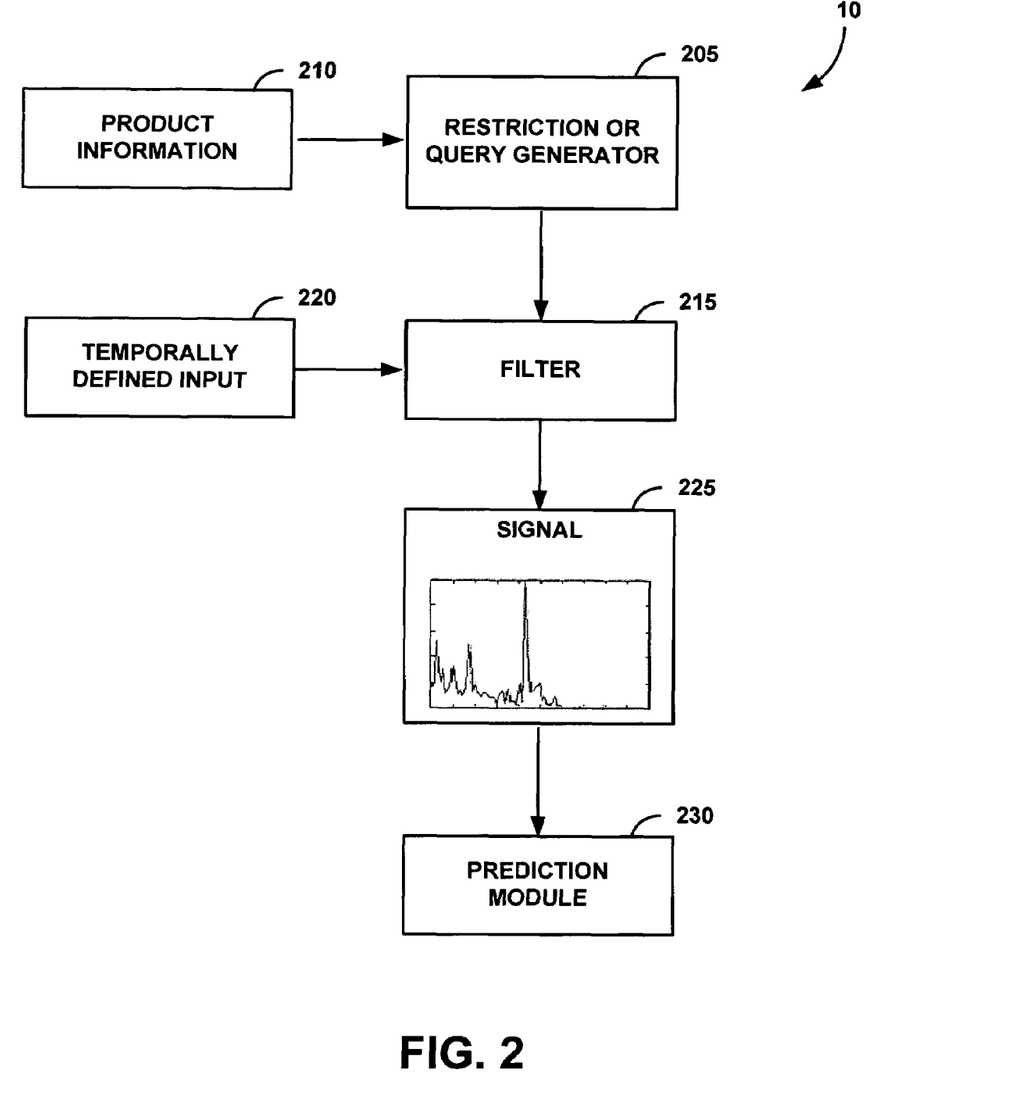
FIG. 2 is a block diagram of the high-level architecture of the sales prediction system of FIG. 1.

FIG. 2 illustrates a high-level hierarchy of system 10. System 10 comprises a restriction or query generator 205. The restriction or query generator 205 receives input from product information 210 and generates either manually or automatically a restriction or query. The filter 215 uses the generated restriction or query to filter temporally defined input 220. Temporally defined input 220 comprises chatter that comprises a time stamp. The filter 215 generates a signal 225 (shown expanded in FIG. 3) that quantifies references to a product specified from product information 210 with respect to time. The prediction module 230 detects spikes in signal 225 of sufficient quality to indicate a pending spike in sales for the specified product. The prediction module 230 further predicts occurrence of an impending spike in sales as indicated by the detected spike.

Figure 3:
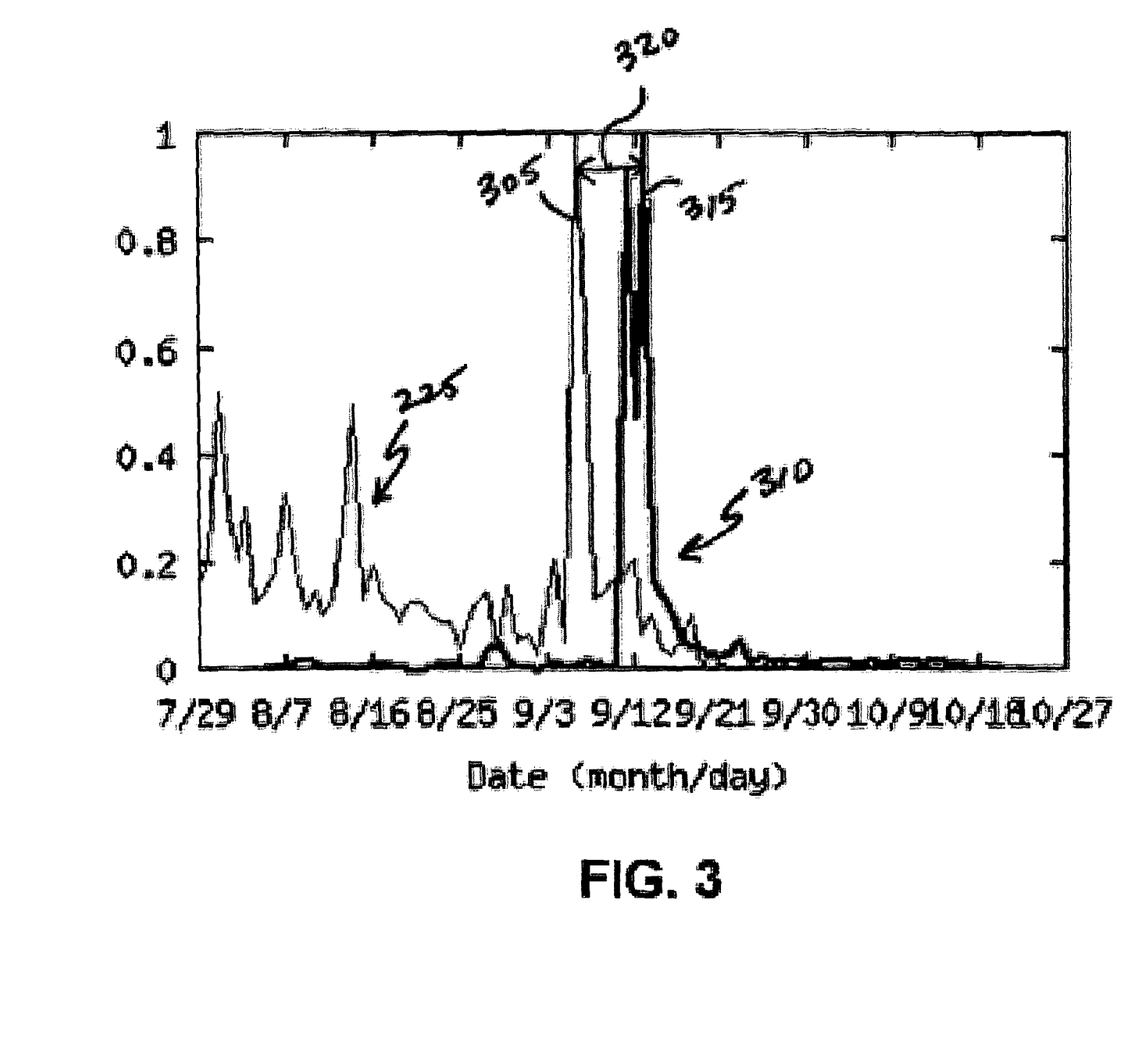
FIG. 3 is a graph illustrating an exemplary spike in chatter in an online public discussion detected by the sales prediction system of FIG. 1 and a predicted spike in sales.

FIG. 3 illustrates an exemplary signal 225 generated by filter 215 from temporally defined input 220 using restrictions or queries generated by restriction or query generator 205. The spike 305 indicates a spike in signal 225 of sufficient quality to indicate a pending spike in sales for the specified product. Signal 310 is measured sales for the product of interest; spike 315 indicates a spike in sales at a lag (time lag 320) after the spike 305 occurred.

An analytical comparison of mentions and sales rank is achieved through the theory of correlation of time series; the mentions and sales rank are both time series. Suppose $x = x_1, \ldots, x_n$ and $y = y_1, \ldots, y_n$ are two time series. The cross-correlation function of two time series is the product-moment correlation as a function of lag, or time-offset, between the series. The sample cross-covariance function is given by:

$$c_{xy} = \frac{1}{n}\sum_{t=1}^{n-k}(x_i-\mu(x))(y_i-\mu(y)) \ k=0,\ldots,n-1,$$

$$c_{xy} = \frac{1}{n}\sum_{t=1-k}^{n}(x_i-\mu(x))(y_i-\mu(y)) \ k=-1,\ldots,-(n-1),$$

where $\mu(\bullet)$ is the sample mean and k is the lag.

The sample cross-correlation is the cross-covariance scaled by the variances of the two series:

$$r_{xy}(k) = \frac{c_{xy}(k)}{\sqrt{c_{xx}(0)\cdot c_{yy}(0)}}$$

where $c_{xx}(0)$ and $c_{yy}(0)$ are the sample variances of x and y respectively. The optimum lag is argmax $c_{xy}(k)$, i.e., the k where the cross-correlation is maximum. The optimum lag is said to be leading if it is negative and trailing if otherwise; the former represents that x leads y as a time series and the latter represents the converse. For system 10, x is the (inverse) sales rank time series and y is the temporally defined input 220.

If there is a spike in the sales rank of a product and there are lots of mentions about the product, then the mention tends to have a spike that is correlated well with the sales rank. Furthermore, a maximum cross-correlation value of at least 0.5 obtained by system 10 suggests a good correlation and the optimum lag is almost always leading. The latter implies that a sudden increase in mentions is a potential predictor of a spike in sales rank.

The restriction or query generator 205 automatically generates queries for filtering the temporally defined input 220. The restriction or query generator 205 uses disambiguation to minimize obtaining false results from the filter 215. For example, information from the 1990 US Census is used to estimate the number of people who may have the name of a certain author, as a proxy for the ambiguity of that name; other methods for disambiguation comprise using the frequency of a name on the web. The automatically generated query is exemplified by an automatic-author-query algorithm in a query for a book based on author, as follows:

min=$10^{-8}$
Single-Author Books:
author=firstname, lastname
If Pr[lastname]<min then
query="lastname"
else
query="firstname lastname" OR "full name"
Two-Author Books:
authors=firstname1, lastname1 & firstname2, lastname2
If lastname1=lastname2
query="lastname1"
else
query="lastname1 AND lastname2"

This exemplary heuristic can be extended to query for books having more than two authors and to use selected words from the book title. A similar heuristic applies to domains such as music, media, and movies. By using more elaborate domain-specific key words, the restriction or query generator 205 can generate automatic queries for other products as well. A variety of other approaches based on more sophisticated processing of, for example, the authors, the title, the category, the keywords, or the comments posted about a book can be applied.

In one embodiment, the prediction module 230 comprises a moving-average-predictor algorithm. Given a fixed-size history of sales rank figures, the moving-average-predictor algorithm in time-series analysis predicts that the value determined tomorrow is a weighted average of the history. In predicting upward or downward motion, the prediction module 230 measures output of the moving-average-predictor algorithm via a single bit indicating its guess about whether sales rank of tomorrow will be less than a current sales rank, or greater than or equal to a current sales rank. The moving-average-predictor algorithm is as follows:

Let w be the window size
Let n be the number of data points
Let $c_1, \ldots, c_w$ be coefficients with $$\sum_{j=1}^{w}|c_j|=1$$

d=0
For t=w to n $$p = \sum_{i=1}^{w}c_i x_{t-i}$$

If sign(p-$x_{t-1}$)=sign($x_t$-$x_{t-1}$) then
d=d+1
Prediction correctness=d/(n-w).

In embodiment, the prediction module 230 comprises exponentially decaying weights (i.e., $c_j \propto 2^{-j}$) for choosing coefficients with uniform weights (i.e., $c_j=1/w$). In another embodiment, the prediction module comprises harmonically decaying weights (i.e., $c_j \propto 1/(j+1)$) for choosing coefficients with uniform weights.

In one embodiment, the prediction module 230 comprises a weighted least-squares predictor. The weighted least-squares predictor performs a weighted regression on the last w values in a time series and predicts a next value based on the weighted regression.

In another embodiment, the prediction module 230 comprises a marhov-predictor algorithm. Given a fixed-size history of sales ranks, the markov-predictor algorithm predicts that a sales rank for tomorrow will be a most likely rank given a history, based on a separate training set. For document d, let d(t) be a rank of the document at time t. The markhov-predictor algorithm is as follows:

Let w be the window size
Let f($\bullet$) be a feature quantizer
Let queue(H) be the queue of feature history
Let D(H) be the learned distribution for history H
Training Step:
For d in training set documents do
For t in timesteps do
δ=f(d(t)–d(t–1))
δ'=f(d(t–1)–d(t–2))
insert (δ', queue(H))
If |H|=w then delete (queue(H))
Increment count of δ in D(H)
Testing Step:
For d in test set documents do For t in timesteps do
Let H be the w-history at t
    $\delta$=f(d(t)−d(t−1))
    $\delta'$=f(d(t−1)−d(t−2))
    insert ($\delta'$, queue(H))
    If H=w then delete (queue(H))
    Predict most likely outcome from D(H)

The prediction module comprises a feature-quantizer that maps differences in sales rank into a number of buckets where the number of buckets, for example, 27 buckets. Different buckets are used to capture positive and negative values. The quantization step by the feature-quantizer algorithm is as follows:

Let $\Delta$ be the temporally defined input 220
If $|\Delta|<=10$ then return $\Delta$
If $|\Delta|<=25$ then return $\text{sign}(\Delta)\cdot 25$
If $|\Delta|<=50$ then return $\text{sign}(\Delta)\cdot 50$
If $|\Delta|<=100$ then return $\text{sign}(\Delta)\cdot 100$ Based on an observation that certain products and certain regions appeared to be more volatile than others, system 10 predicts whether a sales rank of a product tomorrow differs from a current sales rank by more than a predetermined threshold value using volatility. An exemplary threshold is 44, resulting in 50% of the data points in the signal 225 exceeding the threshold.

The prediction module 230 determines when a spike is occurring in mentions of a product in online discussions, and predicts a forthcoming spike in sales rank. The prediction module 230 comprises a spikes-predictor algorithm that performs the following functions:

Find the spikes (or characteristics) that appear to be the largest yet occurring, since system 10 is not interested in essentially unpopular products spiking into popularity;
    Find spikes that exceed historical averages by a predetermined threshold; and
    Find spikes that rise at a predetermined rate.

The predetermined threshold specifies a level of significance that a spike achieves before being selected as a potential predictor of sales. The predetermined rate specifies a rate at which a product receives notice from bloggers.

These functions translate into conditions the algorithm uses to determine whether it can predict a forthcoming spike in sales rank. Let $\mu(\bullet)$ and $\sigma(\bullet)$ denote the mean and standard deviation respectively. The spikes-predictor algorithm is as follows:

Let h be history
Let c be current
Let $\sigma=\sigma(h)$
Let h'=h until five days ago
If c>max(h) AND c>max(h')+$\sigma$
AND c>$\mu$(h)+4$\sigma$ then
Predict spike An exemplary time period of five days is used in the spikes-predictor algorithm. In practice, any time period may be used in the spikes-predictor algorithm. Whenever the predictor predicts that a spike will occur, the prediction module 230 evaluates and categorizes the prediction into one of following categories:

Leading: A spike occurs after time t but within a predetermined elapsed time
    Trailing: A spike already occurred within the past predetermined elapsed time
    Inside: A spike is currently occurring
    Incorrect: A spike does not occur within the predetermined elapsed time of the current time An exemplary predetermined elapsed time is two weeks.

Figure 4:
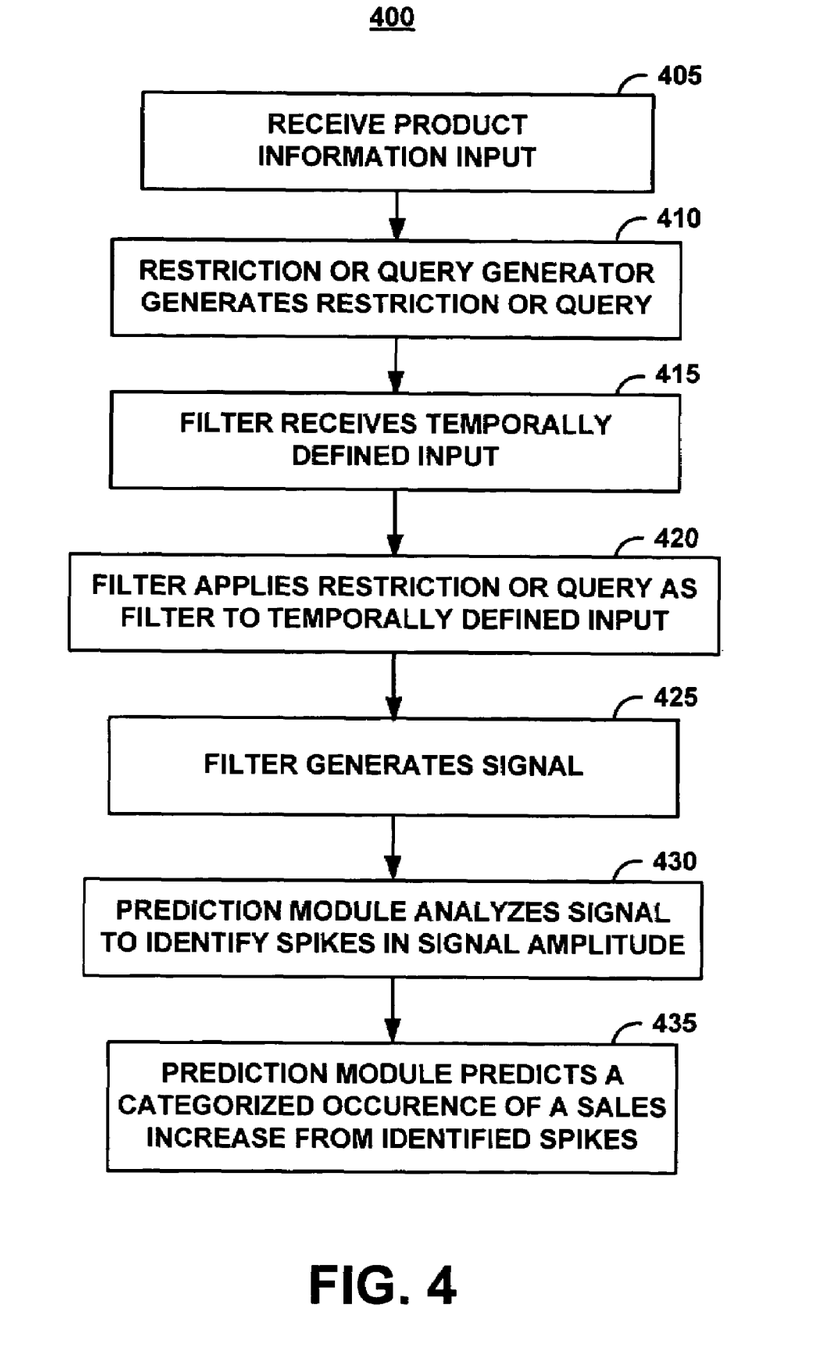
FIG. 4 is a process flow chart illustrating a method of operation of the sales prediction system of FIGS. 1 and 2.

FIG. 4 illustrates an exemplary method 400 of system 10 in predicting sales from online discussions. The restriction or query generator 205 receives product information 210 (step 405). The restriction or query generator either from manual input or automatically generates a restriction or query (step 410). Filter 215 receives temporally defined input 220 (step 415). Filter 215 applies the generated restriction or query as a filter to the temporally defined input (step 420). Filter 215 generates signal 225 (step 425). The prediction module 230 analyzes signal 225 to identify spikes in the amplitude of signal 225 (step 430). The prediction module predicts and categorizes a sales increase from the identified spikes (step 435).

It is to be understood that the specific embodiments of the invention that have been described are merely illustrative of certain applications of the principle of the present invention. Numerous modifications may be made to the system, service, and method for predicting sales from online public discussions described herein without departing from the spirit and scope of the present invention. Moreover, while the present invention is described for illustration purpose only in relation to the WWW, it should be clear that the invention is applicable as well to, for example, a stand-alone database of documents or other text sources that may have been derived from the WWW or other sources. While the present invention is described for illustration purpose only in relation to online public discussion, it should be clear that the invention is applicable, as well to, for example, discussions conducted online in private or semi-private forums comprising subscription forums, and any other forum accessible by a host server.

What is claimed is:

1. A method of predicting an increase in sales from a plurality of online public discussions, comprising:
    receiving from a communications network a product information input for defining a product for which sales are predicted;
    receiving from the communications network a temporally defined input based on the number of times the product receives a mention in one or more sources of online chatter, wherein the temporally defined input comprises a mentions time series for the product derived from online chatter;
    generating by software installed on a computer host server a restriction that is automatically altered using a plurality of levels of disambiguation employing queries based on domain-specific keywords from the product information input to be applied to the temporally defined input;
    filtering with the software installed on the computer host server the temporally defined input with the restriction;
    generating by the software installed on the computer host server, a time-stamped temporally defined input from the filtered temporally defined input;
    generating by the software installed on the computer host server a signal quantifying the number of times the product is mentioned, wherein an amplitude of the signal is based on the number of times the product is mentioned between any two time-stamped temporally defined inputs;
    identifying a spike in the number of times the product is mentioned being present in the signal, wherein the spike is based on a rate of change in the amplitude exceeding a threshold value between the any two time-stamped temporally defined inputs,
        wherein the threshold value is based on a rate over time at which the product receives mentions from the plurality of online discussions;

predicting with a processor a correlation value to create a comparison between the mentions time series and a sales rank time series of said product, wherein the sales rank time series represents measured sales of the product; where the correlation value is given by:

$$r_{xy}(k) = \frac{c_{xy}(k)}{\sqrt{c_{xx}(0) \cdot c_{yy}(0)}}$$

where $c_{xy}$ is given by:

$$c_{xy} = \frac{1}{n}\sum_{t=1}^{n-k}(x_i - \mu(x))(y_i - \mu(y)) \quad k = 0, \ldots, n-1,$$

$$c_{xy} = \frac{1}{n}\sum_{t=1-k}^{n}(x_i - \mu(x))(y_i - \mu(y)) \quad k = -1, \ldots, -(n-1),$$

and where μ is a sample mean and k is a lag value and where $c_{xx}(0)$ and $c_{yy}(0)$ are sample variances of the sales rank time series and the mentions time series, respectively;

determining an optimum lag value for values of k where the correlation value is a maximum, wherein negative values for the optimum lag value are considered leading and non-negative values for the optimum lag value are considered trailing;

predicting the increase in sales of the product from the identified spike of the signal if the correlation value is at least 0.5 and the optimum lag is leading; and adjusting the levels of disambiguation if either the optimum lag is not leading or the correlation value is less than 0.5.

2. The method of claim 1, wherein predicting the increase in sales further comprises the spike exceeding historical averages by a predetermined threshold value of historical averages.

3. The method of claim 1, further comprising entering the restriction manually.

4. The method of claim 1, further comprising automatically generating the restriction.

5. The method of claim 1, wherein the temporally defined input is posted on a public discussion board.

6. The method of claim 5, wherein the public discussion board comprises blogs.

7. The method of claim 5, wherein the public discussion board comprises online discussions.

8. The method of claim 1, wherein predicting the increase in sales comprises using
a moving-average-predictor algorithm that employs a fixed-size history of sales rank figures to predict a tomorrow value of the sales rank time series;
where the moving-average-predictor algorithm comprises exponentially decaying weights for choosing coefficients.

9. A computer program product having a plurality of executable instruction codes that are stored on a computer-readable medium, which, when executed by a computer, predict an increase in sales from a plurality of online public discussions, comprising:
a first set of instruction codes stored on a computer-readable medium for receiving a product information input for defining a product for which sales are predicted;

a second set of instruction codes stored on a computer-readable medium for receiving a temporally defined input based on a number of times the product receives a mention from the plurality of online public discussions, wherein the temporally defined input is derived from on line chatter containing a time stamp;

a third set of instruction codes stored on a computer-readable medium for generating a restriction that can automatically change between a plurality of levels of disambiguation employing queries based on domain-specific keywords, wherein the restriction is applied to the temporally defined input;

a fourth set of instruction codes stored on a computer-readable medium for filtering out false results of the temporally defined input with the restriction;

a fifth set of instruction codes stored on a computer-readable medium for generating a signal quantifying the number of times the product is mentioned, wherein an amplitude of the signal is based on the number of times the product is mentioned in the temporally defined input;

a sixth set of instruction codes stored on a computer-readable medium for identifying one or more spikes in the number of times the product is mentioned being present in the signal, wherein the one or more spikes are based on a rate of change in the amplitude exceeding a threshold value between two points in time in the temporally defined input;

a seventh set of instruction codes stored on a computer-readable medium for identifying a largest spike among the one or more spikes, wherein the largest spike includes a highest amplitude of the generated signal among a selected number of the one or more spikes with respective amplitudes exceeding the threshold value;

an eighth set of instruction codes stored on a computer-readable medium for generating a correlation value between the temporally defined input and a sales rank time series of said product, wherein the sales rank time series represents measured sales of the product, and using the correlation value as a comparison between measured sales of the product and the temporally defined input, determining an optimum lag value for values where the correlation value is a maximum, wherein negative values for the optimum lag value are considered leading and non-negative values for the optimum lag value are considered trailing; and a ninth set of instruction codes stored on a computer-readable medium for predicting the increase in sales of the product from the identified largest spike of the generated signal, where the predicting comprises:
a spikes-predictor algorithm that categorizes a prediction as one of the categories selected from the group consisting of leading, trailing, inside, and incorrect;
wherein the leading category indicates the identified largest spike occurs after a time t but within a predetermined elapsed time;
wherein the trailing category indicates the identified largest spike has already occurred within the predetermined elapsed time;
wherein the inside category indicates the identified largest spike is currently occurring; and
wherein the incorrect category indicates the identified largest spike does not occur within the predetermined elapsed time; and
a prediction algorithm that predicts the increase in sales of the product from the added spike of the signal if the correlation value is at least 0.5, the optimum lag is leading and there is a sudden increase in the temporally defined input, wherein the prediction algorithm includes feature quantizing that maps differences in elements of the sales rank times series to predict if the tomorrow value differs from a current value by more than a predetermined value, wherein the prediction algorithm alters the level of disambiguation if the optimum lag is not leading or the correlation value is less than 0.5.

10. The computer program product of claim 9 wherein the predetermined elapsed time is two weeks.

11. The computer program product of claim 9 wherein predicting further comprises the spike exceeding historical averages by a predetermined threshold value of historical averages.

12. The computer program product of claim 9 further comprising entering the restriction manually.

13. The computer program product of claim 9 further comprising automatically generating the restriction.

14. The computer program product of claim 9 wherein the temporally defined input is posted on a public discussion board.

15. The computer program product of claim 9 wherein the prediction algorithm that predicts the increase in sales comprises using a moving-average-predictor algorithm that employs a fixed-size history of sales rank figures to predict a tomorrow value of the sales rank time series;

where the moving-average-predictor algorithm comprises harmonically decaying weights for choosing coefficients with uniform weights.

* * * * *